US005411168A

United States Patent [19]

Mertens et al.

[11] Patent Number: 5,411,168

[45] Date of Patent: May 2, 1995

[54] SHEET DISPENSER AND DISPENSER SUBASSEMBLIES

[75] Inventors: Timothy A. Mertens, Cottage Grove; Alden R. Miles, Lakeville; Wayne K. Darvell, North St. Paul; David C. Windorski, Woodbury, all of Minn.

[73] Assignee: Minnesota Mining and Manufacturing Company, St. Paul, Minn.

[21] Appl. No.: 101,615

[22] Filed: Aug. 3, 1993

[51] Int. Cl.[6] .................... B65G 59/02

[52] U.S. Cl. .................... 221/22; 221/33; 221/45; 221/47; 221/282; 221/309; 206/233; 206/447; 383/39; 229/74

[58] Field of Search .................... 221/22, 26, 33, 45, 221/47, 64, 55, 284, 282, 305, 307, 309, 312 C; 206/233, 447; 383/39; 229/72, 74

[56] References Cited

U.S. PATENT DOCUMENTS

| | | | |
|---|---|---|---|
| 1,844,258 | 2/1932 | Loomis, Jr. | 206/233 X |
| 3,089,586 | 5/1963 | Cole | 221/45 |
| 3,295,746 | 1/1967 | Duncan | 229/74 X |
| 3,330,470 | 7/1967 | Timms | 229/74 |
| 3,507,444 | 4/1970 | Werby | 229/74 X |
| 3,691,140 | 9/1972 | Silver | 260/78.5 |
| 3,857,731 | 12/1974 | Merrill, Jr. et al. | 117/122 |
| 4,131,195 | 12/1978 | Worrell, Sr. | 206/233 X |
| 4,166,152 | 8/1979 | Baker et al. | 428/522 |
| 4,416,392 | 11/1983 | Smith | 221/45 |
| 4,653,666 | 3/1987 | Mertens | 221/45 |
| 4,768,810 | 9/1988 | Mertens | 282/12 |
| 4,770,320 | 9/1988 | Miles et al. | 221/33 |
| 4,773,584 | 9/1988 | Instance | 229/74 |
| 4,786,696 | 11/1988 | Bohnel | 426/88 |
| 4,895,746 | 1/1990 | Mertens | 428/40 |
| 4,907,825 | 3/1990 | Miles et al. | 281/51 |
| 5,050,909 | 9/1991 | Mertens et al. | 283/81 |
| 5,080,254 | 1/1992 | Feer | 221/45 X |
| 5,080,255 | 1/1992 | Windorski | 221/45 |
| 5,086,946 | 2/1992 | Blackwell et al. | 221/45 |
| 5,158,205 | 10/1992 | Bodziak et al. | 221/51 |
| 5,165,570 | 11/1992 | Windorski et al. | 221/46 |
| 5,167,346 | 12/1992 | Bodziak | 221/63 |

FOREIGN PATENT DOCUMENTS

0439941A1 8/1991 European Pat. Off. .

*Primary Examiner*—Cheryl L. Gastineau
*Assistant Examiner*—Dean A. Reichard
*Attorney, Agent, or Firm*—William L. Huebsch; Walter N. Kirn; Gary L. Griswold

[57] ABSTRACT

A sheet dispenser or sheet dispenser subassembly including a coherent stack of tape flags or other adhesive-bearing sheets that can be unobtrusively permanently or removably adhered on a page of a book, catalog, brochure, etc., because it has a supple cover layer that is a thin, tear-resistant polymeric film. The dispenser subassembly has a pressure-sensitive adhesive layer on a peripheral portion of the cover layer by which it can be adhered to the page which then serves as a back layer for the dispenser, whereas the dispenser includes a bottom layer on an outer surface of which is a layer of pressure-sensitive adhesive layer by which the dispenser can be adhered to a surface.

26 Claims, 4 Drawing Sheets

SHEET DISPENSER AND DISPENSER SUBASSEMBLIES

FIELD OF THE INVENTION

The invention relates to dispensers for sheets from a coherent stack of sheets, each sheet bearing a band of pressure-sensitive adhesive, such as a repositionable pressure-sensitive adhesive, by which it can be self-adhered to a variety of surfaces. The invention is particularly related to such dispensers which have low profiles so that they can be adhered to an inside page of a magazine, catalog, notebook, or the like without creating an unsightly bulge.

DESCRIPTION OF THE RELATED ART

Minnesota Mining and Manufacturing Company or 3M (the company to which this application is assigned) markets a Post-it TM brand repositionable tape flag that can be self-adhered to an object, e.g., to mark a page of a book to draw attention to that page or to specific information on that page. Typical is the tape flag (10) of FIG. 1 of co-assigned U.S. Pat. No. 4,907,825 (Miles et al.) which has an elongate layer (11) of flexible polymeric material having a wide band (16) of repositionable pressure-sensitive adhesive covering one major surface of one end (the second end portion 15) of the polymeric material while being free of adhesive on both major surfaces of the other end (the first end portion 19). The first end portion preferably is brightly colored to attract attention while the second end portion is transparent so that it does not obscure a substrate to which it is applied.

A dispenser for a coherent stack of tape flags (10) is shown in FIGS. 3–7 of the Miles et al. patent. In the stack, the first and second end portions of successive tape flags are reversed so that the adhesive of each tape flag adheres to the brightly colored second end portion of the underlying tape flag, except that the lowermost tape flag is adhered to an adhesive-free bottom sheet (33). The bottom sheet, in combination with the low-friction nature of the bottom wall (37) of the dispenser, permits the stack to shuttle back or forth in an elongated closed chamber (38) while successive uppermost tape flags are pulled through a central transverse slot (42).

The dispenser of FIGS. 3 through 7 of the Miles et al patent can be called a "pop-up" dispenser, because upon pulling successive uppermost tape flags through the central transverse slot, an end portion of the next tape flag pops up through the slot.

The Miles et al patent shows in FIG. 9 a repositionable tape flag (80) which differs from that of FIG. 1 in that its band of repositionable pressure-sensitive adhesive (86) covers one entire surface of the polymeric material (81), and release material covers the opposite face of the polymeric material only at one end (85). When a plurality of these tape flags (80) are stacked with the bands of release material of adjacent tape flags at opposite ends of the stack and successive uppermost tape flags are pulled through a central transverse slot (102), the stack shuttles back and forth in an elongated closed chamber (98) and the next tape flag pops up through the slot. For additional disclosure of coherent stacks of adhesive-bearing sheets, see co-assigned U.S. Pat. No. 4,895,746 (Mertens) and U.S. Pat. No. 5,086,946 (Blackwell).

3M has advertised repositionable tape flags by distributing samples in similar pop-up dispenser that has a low profile to allow it to be incorporated into a magazine, catalog, or the like without an unsightly bulge. This low-profile dispenser employed a laminate including a paper cover layer having an aggressive pressure-sensitive adhesive layer along an inner surface, a central portion of which cover layer was covered by a smaller piece of paper so that the adhesive layer was exposed only around a peripheral portion of the laminate. After forming a central transverse slot through the laminate, a series of the laminates were disposed along a release liner. The pop-up dispensers were then formed by sequentially removing one of the laminates from the liner, positioning a stack of about ten tape flags along the central portion of the laminate on its side adjacent the exposed adhesive with an end portion of the uppermost tape flag on the stack projecting through the slot, and then adhering the adhesive to an advertising sheet so that the central portion of the laminate and adjacent portion of the advertising sheet formed a chamber for the stack of tape flags with an end of the uppermost flag laying flat against the outer surface of the laminate. Printed on the advertising page above and below an arrow that pointed to the protruding tape flag end portion were the words: "Free Samples" and "Pull Up". This dispenser is below called the "Prior Low-profile Tape Flag Dispenser".

In the Prior Low-profile Tape Flag Dispenser the stack of tape flags shuttled back and forth in an elongated closed chamber which was longer than the stack. Other rather low profile dispensers are known in which the chamber is about the same size as the stack and the stack does not need to shuttle. Such a dispenser is disclosed in co-assigned U.S. Pat. No. 5,158,205 (Bodziak et al.). In FIGS. 1–6 of the Bodziak patent, a dispenser made of folded card stock forms a chamber closely containing a stack (12) of paper sheets. Centrally across the top wall (22) of that dispenser is a slot (30) through which paper sheets can be successively pulled from the stack. Each of the sheets has a narrow band of repositionable pressure-sensitive adhesive (14) coated on one surface adjacent one edge. When the uppermost sheet of the stack is pulled through the slot, flanking slits (24) at each end of the slot allow one of two opposed flap-like portions (28) of the top wall to flex as shown in FIG. 4 while the other flap-like portion places a drag on the next sheet so that the uppermost sheet will peel away from the next sheet.

The pop-up dispenser of the Bodziak patent is being used for coherent stacks of Post-it TM brand self-stick repositionable notes that consist of pieces of paper, each having a narrow band of repositionable pressure-sensitive adhesive coated on one surface adjacent one edge. Among a variety of other pop-up dispensers that have been described in the art for use with coherent stacks of Post-it TM brand self-stick repositionable notes are those disclosed in co-assigned U.S. Pat. Nos. 4,416,392 (Smith), 4,653,666 (Mertens), 5,080,255 (Windorski), 5,165,570 (Windorski et al), 5,167,346 (Bodziak) and 5,158,205 (Bodziak et al). FIGS. 1–13 of U.S. Pat. No. 5,165,570 illustrate dispensers having a base surface bearing a pair of foam-backed pressure-sensitive adhesive strips covered with a release liner by which the dispenser can be adhesively anchored to a substrate.

SUMMARY OF THE INVENTION

The present invention concerns sheet dispenser subassemblies or sheet dispensers including coherent stacks of tape flags or other adhesive-bearing sheets which, when adhered to a substrate, will have low profiles like the above-discussed low-profile dispensers, permitting them to be used unobtrusively on an inside page of a book, catalog, brochure, or the like. The novel sheet dispenser subassemblies differ from the Prior Low-profile Tape Flag Dispenser described above in that they are in a sub-assembled form with stacks of sheets pre-positioned along a cover layer from which they can more easily be applied to substrates that, after such application, form part of the resultant dispenser, which application can be done either manually or by automated equipment such as label applying equipment. The substrates to which the sheet dispenser sub assemblies can be applied, in addition to advertising pages, can easily include the surface of a personal computer or a page or cover of a book, magazine, or personal organizer, or substrates wherever else there is need for convenient access to adhesive-bearing sheets.

Generally, the sheet dispenser subassembly according to the present invention comprises:

(a) a stack of sheets disposed one on top of another with ends of the sheets being in alignment in the stack, and layers of adhesive permanently adhered to first side surfaces of backings for the sheets and releasably adhered along opposite second surfaces of the adjacent sheets in said stack. At least some of the sheets comprise release means for providing a first adhesion level along first end portions of the sheets adjacent first ends of the backings between the first and second side surfaces of the adjacent sheets in the stack, which first adhesion level provides a sufficiently low or no release force between the first side surfaces and the adjacent sheets to which the adhesive along those first side surfaces are releasable adhered to afford sliding movement between the side surfaces of the adjacent sheets along the first end portions, and attachment means for providing a second adhesion level along second end portions of the sheets adjacent second ends of the backings between the layers of adhesive and the second side surfaces of the adjacent sheets in the stack to which the layers of adhesive are releasably adhered, which second adhesion level provides a release force that is higher than the sufficiently low release force along the first end portions and firmly adhere the sheets to the adjacent sheets in the stack during sliding movement of the sheets relative to the adjacent sheets along the first end portions while affording peeling away of the sheets from the stack along the second end portions;

(b) a cover layer which has inner and outer major surfaces, a central portion, a peripheral portion or portions on at least two opposite sides of the central portion, and a through slot extending transversely across the central portion;

(c) the stack of sheets being positioned along the inner surface adjacent the central portion with the first end portion of the uppermost sheet in the stack extending through the slot;

(d) the sheets and slot being adapted to afford dispensing of the sheet having the first end portion extending through the slot when that first end portion is manually pulled through the slot by sequential sliding movement of one of the sheets relative to the adjacent sheet along the first end portion and peeling away of the sheet from the stack along the second end portion, and positioning of the first end portion of an underlying sheet in a position extending through the slot as a result of such dispensing;

(e) a coating of pressure-sensitive adhesive on the inner surface of the cover layer along the peripheral portion or portions of the cover layer;

(f) means for causing the inner surface along the central portion to be free of adhesive; and (g) protecting and retaining means for temporarily protecting the coating of pressure-sensitive adhesive on the peripheral portion or portions and retaining the stack of sheets along the central portion.

The protecting and retaining means can be provided by a disposable release liner removably adhered to the coating of pressure-sensitive adhesive and across the stack and the central portion, which release liner is removable to permit the cover layer to be adhered by the coating of pressure-sensitive adhesive on a surface with the stack of sheets in a chamber defined between the central portion of the cover layer and an adjacent portion of the surface and with the first end portion of the uppermost sheet in the stack projecting through the slot and positioned along its outer surface. The release liner can be sized for a single cover layer or can be an elongate strip with a plurality of the cover layers along its length which is wound into a roll for convenient storage and shipment.

Alternatively, the protecting and retaining means can be provided by the sheet dispenser sub assembly being one of a plurality of sheet dispenser subassemblies which are disposed adhered together with the layer of pressure-sensitive adhesive on the inner surface along the peripheral portion or portions of the cover layer on at least some of the sheet dispenser subassemblies releasably adhered to the outer surface of the cover layer on an underlying adjacent sheet dispenser subassembly such as (1) by the sheet dispenser subassemblies being aligned in a stack, or (2) the cover layers being provided by a substantially continuous polymeric film that is perforated between adjacent dispenser subassemblies to afford separation of the dispenser sub assemblies, and the substantially continuous polymeric film being helically wound into a roll.

Generally the sheet dispenser according to the present invention comprises:

(a) a stack of sheets like that described above with reference to the dispenser sub assembly;

(b) a thin, supple cover layer having inner and outer major surfaces, a central portion, a peripheral portion or portions on at least two opposite sides of said central portion, and a through slot extending transversely across said central portion;

(c) the stack of sheets positioned along the inner surface adjacent the central portion with the first end portion of the uppermost sheet in the stack extending through the slot;

(d) a thin, supple bottom layer having inner and outer surfaces, which bottom layer extends over the inner surface of the cover layer and the stack of sheets and is attached to the peripheral portion of the cover layer with the inner surface of the bottom layer adjacent the cover layer to form a chamber around the stack of sheets;

(e) the sheets, slot and chamber being adapted to afford dispensing of the sheet having the first end portion extending through the slot when that first end portion is manually pulled through the slot by sequential sliding movement of one of the sheets relative to the adjacent sheet along the first end portion and peeling away of the sheet from the stack along said second end portion, and positioning of the first end portion of an underlying sheet in a position extending through the slot as a result of the dispensing;

(f) a layer of pressure-sensitive adhesive on the outer surface of the bottom layer; and (g) a disposable release liner over the surface of the layer of pressure-sensitive adhesive layer opposite the bottom layer, which release liner can be removed to permit the dispenser to be adhered to a surface.

In the sheet dispenser as compared to the sheet dispenser subassembly, the thin bottom layer prevents the stack from being accidentally displaced upon removal of the disposable release liner, but at the added expense of the bottom layer. The bottom layer preferably is as thin as possible so that the novel dispenser can be as unobtrusive when self-mounted on a flat surface that is flexible such as a page of a book, catalog, brochure, etc.

The cover layer can be of strong, supple tear resistant paper or polymeric material, and can be less than 0.2 millimeter (0.008 inch) in thickness. Preferably the cover layer and, when present, the bottom layer is from 0.02 to 0.1 millimeter (0.00075 to 0.004 inch) in thickness. The bottom layer of the sheet dispenser preferably is strong and tear-resistant like the cover layer and so also can be of a strong tear-resistant paper or polymeric material. A polymeric film material that is useful as both the cover layer and the bottom layer is biaxially oriented polypropylene which is especially useful at thicknesses from 0.02 to 0.05 millimeter (0.00075 to 0.002 inch). Among other useful tear-resistant polymeric films are biaxially oriented polyethylene and biaxially oriented poly(ethyleneterephthalate). The polymeric film used for the cover layer and for the bottom layer can be reinforced by filaments or other fibers including paper. The bottom layer does not always need to be tear-resistant.

Because the cover layer and, when present, the bottom layer can be quite thin, each of the sheet dispenser subassembly and the sheet dispenser can have a low profile that is only slightly thicker than its stack. The cover layer and the bottom layer (when present) can be supple so that they do not need to be embossed and so that the sheet dispensers can flex somewhat without being damaged when they are adhered on the surface of a flexible sheet or similar structure. The cover layer also should have good dimensional stability to afford a durable, attractive appearance when it is positioned over the stack.

The uppermost sheet that initially extends through the slot can be a disposable leader which, when pulled through the slot, leaves the next (now uppermost) sheet extending through the slot.

The layer of pressure-sensitive adhesive by which the sheet dispenser subassembly and the sheet dispenser can be adhered to a substrate can be of an aggressive adhesive to afford permanent mounting on most surfaces, or can be of repositionable pressure sensitive adhesive to permit the sheet dispenser subassembly or sheet dispenser to be moved from place to place and eventually removed and discarded after its stack has been exhausted. While some conventional pressure-sensitive adhesives are repositionable, an especially useful unconventional class is based on solid, inherently tacky, elastomeric microspheres, such as pressure-sensitive adhesives disclosed in the following co-assigned patents: U.S. Pat. No. 3,691,140 (Silver), U.S. Pat. No. 3,857,731 (Merrill et al.), U.S. Pat. No. 4,166,152 (Baker et al.), and U.S. Pat. No. 4,786,696 (Bohnel), and EP No. 439,941 (Bohnel et al.). The latter discloses a high-tack pressure-sensitive adhesive that would enhance the ability of the novel sheet dispenser or sheet dispenser sub assembly to remain securely mounted on a vertical flat surface.

Different types of dispensers including stacks of different types of sheets that, for stacks of only a few sheets, can be emulated by sheet dispenser subassemblies or sheet dispensers according to the present invention include those described in U.S. Pat. No. 4,907,825 (Miles et al, see FIGS. 3–7); U.S. Pat. No. 5,050,909 (Mertens et al, see FIGS. 11–13); U.S. Pat. No. 5,158,205 (Bodziak et al, see FIGS. 1–8), and U.S. Pat. No. 5,086,946 (Blackwell et al).

BRIEF DESCRIPTION OF THE DRAWING

The present invention will be further described with reference to the accompanying drawing wherein like parts are identified with like reference numerals in the several views and wherein.

DESCRIPTION OF THE PREFERRED EMBODIMENTS

Figure 1:
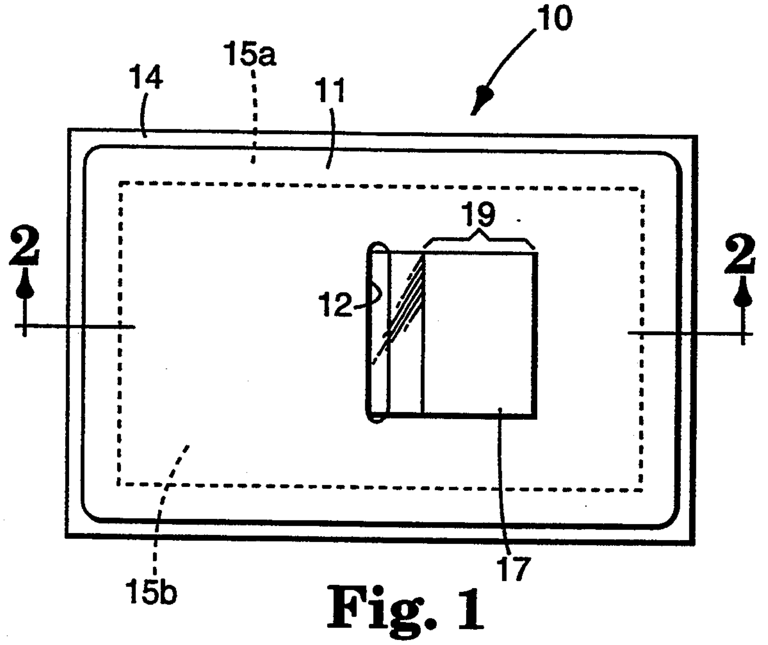
FIG. 1 is a plan view of a first embodiment of a sheet dispenser subassembly according to the present invention.
Figure 2:
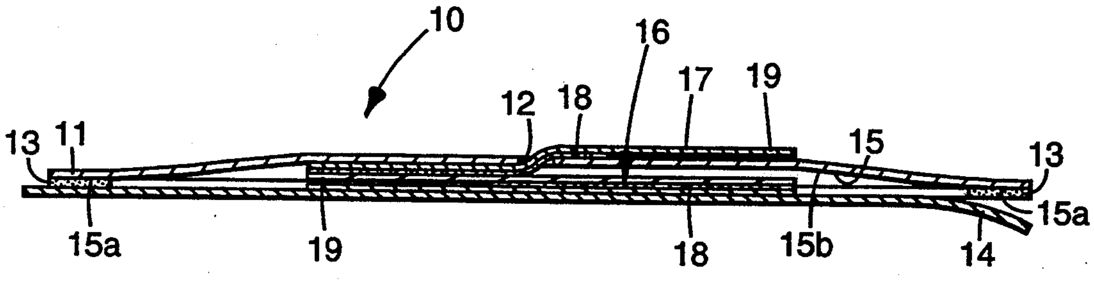
FIG. 2 is a longitudinal cross section taken generally along line 2—2 of FIG. 1 with the release liner being peeled off to permit the sheet dispenser subassembly to be adhered to a flat surface.

Referring now to FIGS. 1 and 2, there is illustrated a first embodiment of a sheet dispenser subassembly according to the present invention generally designated by the reference numeral 10.

The sheet dispenser subassembly 10 includes a thin, supple, elongated, tear-resistant cover layer 11 which is a polymeric film having a central transverse slot 12. Covering only a peripheral portion 15*a* of an inner surface 15 of the cover layer 11 is a coating 13 of pressure-sensitive adhesive (which adhesive could be aggressive or repositionable) which coating 13 is protected by a disposable release liner 14. Positioned adjacent a central portion 15*b* of the cover layer 11 along its inner surface 15 and overlaid by the release liner 14 is a coherent stack 16 of adhesive-bearing sheets (e.g., a stack 16 of the sheets described in U.S. Pat. No. 4,907,825, the content whereof describing the sheets and the way they are disposed in a stack is incorporated herein by reference). The release liner 14, then, provides protecting and retaining means for temporarily protecting the coating 13 of pressure-sensitive adhesive on the peripheral portion 15*a* of the cover layer 11 and for retaining the stack 16 of sheets along the central portion 15*b* of the inner surface 15. An end portion 17 of the uppermost 17 of the sheets in the stack 16 extends through the slot 12 and lays flat against the exposed outer surface of the cover layer 11. On an underside or second surface of each of the adhesive-bearing sheets is a layer or wide band 18 of pressure-sensitive adhesive adjacent a second end of the sheet, with the wide bands of successive sheets at opposite ends of the stack 16. Both first and second surfaces of each of the adhesive-bearing sheets are free from adhesive along a portion 19 adjacent a first end opposite the second end. That portion 19 of each adhesive-bearing sheet can be brightly colored so that the sheet acts as a tape flag by attracting attention with its brightly colored portion 19 while its adhesive-bearing portion is transparent so that it does not obscure a substrate to which the sheet or tape flag is releasably adhered.

In FIG. 2, one end of the release liner 14 is being peeled from the sheet dispenser sub assembly 10 to permit it to be adhered on a generally flat surface (not shown) by its coating 13 of pressure-sensitive adhesive.

Even though the stack 16 of adhesive-bearing sheets is exposed upon removal of the release liner 14, it tends to stay in place because the uppermost adhesive-bearing sheet tends to lie flat against the exposed outer surface of the cover layer 11, as shown in FIG. 2. Because the dispenser 10 has a low profile, its stack 16 has so little mass that it is unlikely to be dislodged by gravity before it is enclosed by being adhered on a flat surface. Even when the stack has a greater mass, the stack 16 can be held in place by ones fingertips until it is so enclosed.

Because the cover layer 11 is supple, it bows out to accommodate the stack 16, and the bowing is barely noticeable when there are up to about twenty tape flags in the stack 16, even after adhering the dispenser 10 on a flat surface that is rigid. In the direction perpendicular to the central transverse slot 12, the central portion 15*b* of the inner surface 15 has sufficient length to permit the stack 16 to be shuttled back and forth in a chamber defined between the central portion 15*b* and a surface to which the sheet dispenser subassembly is adhered by the layer 13 of adhesive when the uppermost sheets or tape flags are sequentially pulled through the slot 12.

Figure 3:
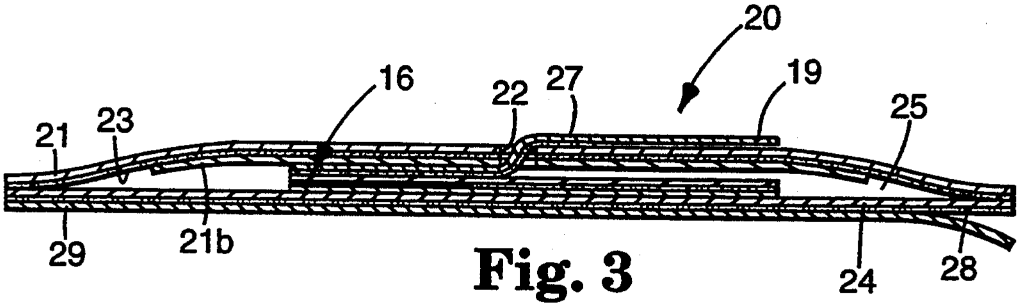
FIG. 3 is a longitudinal cross section through a second embodiment of a sheet dispenser according to the present invention with its release liner being peeled off.

FIG. 3 illustrates a pop-up sheet dispenser according to the present invention, generally designated by the reference numeral 20.

The sheet dispenser 20 has a thin, elongated, tear-resistant cover layer 21 of polymeric film having a layer 23 of permanent adhesive along its inner surface by which the layer 21 of film is laminated to a smaller piece of paper 21*b* that covers its central portion so that the adhesive layer is exposed only around a peripheral portion of the layer 21 of polymeric film. Extending through the cover layer 21, adhesive layer and paper 21*b* is a central transverse slot 22. The portion of the layer of adhesive 23 exposed around the piece of paper 21*b* permanently adheres the cover layer 21 to a thin, supple bottom layer 24. When the layer of adhesive 23 is tack-free, it can be adhered to the piece of paper 21*b* and to the bottom layer 24 by being activated by heat or ultrasonically. Alternatively the layer 21 of film could be attached to the bottom layer 24 by other means such as heat fusion in which case the layer 23 of adhesive and the piece 21*b* of paper could be eliminated.

Positioned within a closed chamber 25 formed between the central portion of the cover layer 21 and bottom layer 24 is a coherent stack 16 of adhesive-bearing sheets or tape flags, an end portion 19 of the uppermost of which sheets extends through the slot 22 and lays flat against the exposed outer surface of the cover layer 21. The sheets or tape flags of the stack 16 are identical to the adhesive-bearing sheets of the stack 16 illustrated and described with reference to FIGS. 1 and 2.

Covering the outer face of the bottom layer 24 is a coating 28 of pressure-sensitive adhesive which is temporarily protected by a release liner 29 that is being peeled off to permit the dispenser 20 to be self-mounted on a flat surface (not shown) by the coating 28 of adhesive. The coating 28 of adhesive can be of aggressive or repositionable adhesive.

Figure 4:
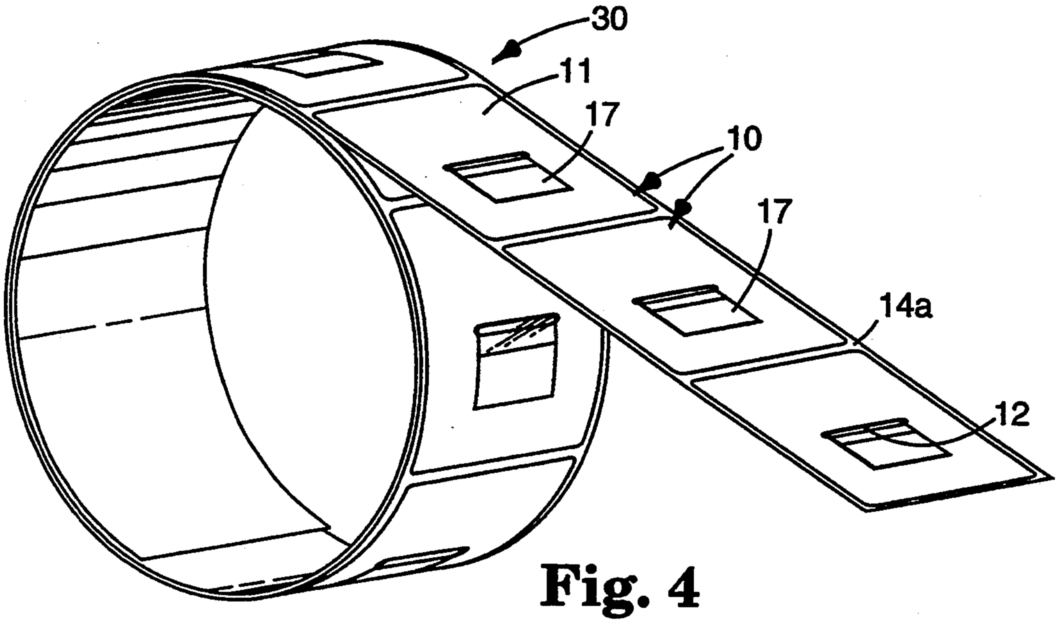
FIG. 4 is a perspective view showing a roll of a plurality of the sheet dispenser sub assemblies of FIG. 1 being unwound from a roll.

FIG. 4 illustrates that the disposable release liner 14 of FIGS. 1 and 2 can be an elongate strip 14*a* on which a plurality of spaced identical sheet dispenser subassemblies 10 are positioned, which elongate strip 14*a* of disposable release liner and sheet dispenser subassemblies 10 can be convolutely wound into a roll 30. Such a roll 30 can be used in automated equipment, e.g., known labelling machines by which the dispenser subassemblies can be individually adhered or self-mounted on sheets of paper to be bound or tipped into books, magazines, catalogs or the like.

Figure 5:
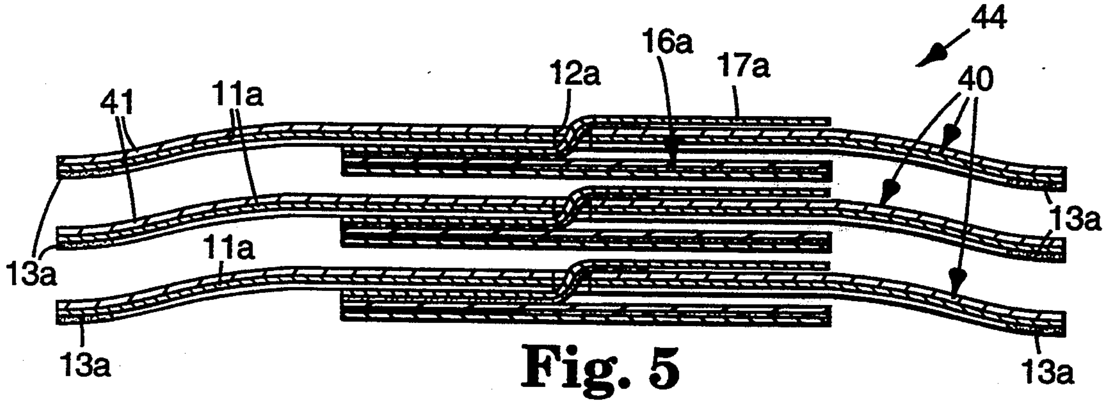
FIG. 5 is a longitudinal cross section through a plurality of a third embodiment of sheet dispenser subassemblies according to the dispenser invention.

Referring now to FIG. 5 of the drawing, there is illustrated a plurality of sheet dispenser subassemblies 40 according to the present invention. The three dispenser subassemblies 40 illustrated are spaced apart for clarity concerning the parts associated with each, but they can be adhered together to form a stack 44 of the subassemblies 40 from which either the top or bottom sub assembly 40 can be peeled to be used individually.

Each of the subassemblies 40 includes a thin, elongated, tear-resistant polymeric film cover layer 11*a* having a central transverse slot 12*a* and a peripheral portion on which there is a coating 13*a* of pressure-sensitive adhesive, and a stack 16*a* of adhesive coated sheets positioned adjacent a central portion of the cover layer 11*a* along its inner surface with an end portion 17*a* of the uppermost sheet in the stack 16*a* projecting through the slot 12*a* and laying along the outer surface of the cover layer 11*a*. The layer 11*a*, slot 12*a* coating 13*a* and stack 16*a* of the subassemblies 40 are essentially the same as the corresponding layer 11, slot 12, coating 13 and stack 16 of the subassembly 10 described with reference to FIGS. 1 and 2. The subassemblies 40 differ from the subassembly 10 of FIGS. 1 and 2 in that the outer surface of the cover layer 11*a* is covered with an ultrathin release coating 41 which is required only around its periphery but, as illustrated, is more easily applied to cover the entire outer surface of the cover layer 11*a*. The coating 13*a* of pressure-sensitive adhesive of each of the dispenser subassemblies 40 temporarily adheres it to the release coating 41 of the underlying dispenser or, in the case of the lowermost sheet dispenser subassembly 40, to a disposable liner (not shown) that has an ultrathin release coating. Adhering the sheet dispenser subassemblies 40 together in the stack 44 together with the liner provides protecting and retaining means for temporarily protecting the coatings 13*a* of pressure-sensitive adhesive on the peripheral portions of the cover layers 11*a* and for retaining the stack 16 of sheets along their central portions.

Because each dispenser subassembly 40 has a supple flexible cover layer 11*a*, it can easily be peeled from the adjacent dispenser subassembly 40 in the stack 44 and can then be adhered by its coating 13*a* of pressure-sensitive adhesive on a generally flat surface.

Instead of stacking, the protecting and retaining means for temporarily protecting the coatings 13*a* of pressure-sensitive adhesive on the peripheral portions of the cover layers 11*a* and for retaining the stack 16*a* of sheets along their central portions on the sheet dispenser sub assemblies 40 can be provided, as will be illustrated for a later described embodiment of the sheet dispenser subassembly, by making a concatenation of cover layers 11*a* from an elongate strip, and wrapping the dispenser subassemblies 40 on an inner core and on themselves, after which the sub assemblies 40 can be separated either at perforations between them or by cutting them apart.

The sheet dispenser subassemblies 10 and 40 and sheet dispenser 20 all include stacks of adhesive coated sheets or tape flags that each have a wide band or layer of pressure-sensitive adhesive covering at least 50% of the area of one surface of each sheet. Other dispenser subassemblies or dispensers according to the present invention can include stacks of paper or polymeric sheets that either have a narrow band or layer(less than 50% of the surface area of each sheet) of pressure-sensitive adhesive (like the repositionable sheets of the above-discussed Smith U.S. Pat. No. 4,416,392) or a wide band that covers one entire surface of each sheet (like the repositionable sheets described in the above-cited Miles et al U.S. Pat. No. 4,907,825 and Blackwell U.S. Pat. No. 5,086,946. Other sheets that may be useful to form stacks with the sheets in the stacks disposed as taught in the Smith U.S. Pat. No. 4,416,392 are those sheets with both tab and body portions taught in U.S. patent application Ser. No. 08/084,798 filed Jun. 29, 1993, the content whereof is incorporated herein by reference.

Figure 6:
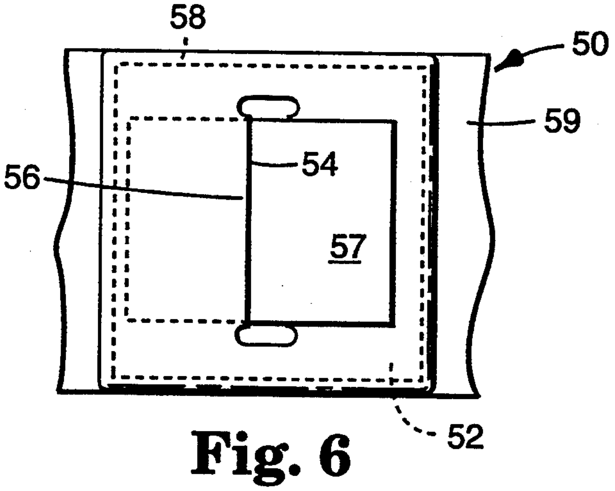
FIG. 6 is a plan view of a fourth embodiment of a sheet dispenser subassembly according to the present invention.

FIG. 6 shows a dispenser subassembly 50 including a stack of note paper and including a cover layer 52 made from card stack (but which could also be made of polymeric material) having a slot 54 through which sheets from the stack of note paper can be sequentially dispensed. The slot 54 is shaped in the manner disclosed in the above-discussed Bodziak U.S. Pat. No. 5,158,205, the content whereof describing the material of its top wall, the shape of the slot 54 in the top wall and the stack of note paper dispensed are hereby incorporated herein by reference. The slot 54 includes slits that define a flap 56 at either side of the slot 54. Positioned adjacent a central portion of an inner surface of the cover layer 52 is the stack of sheets, each having a narrow band of repositionable pressure-sensitive adhesive (not shown) coated on one surface adjacent one edge. Only the uppermost sheet 57 of the stack is shown, protruding through the slot 54. When the uppermost sheet 57 is pulled through the slot 54, the flap above the hidden portion of the sheet 57 flexes while the other flap places a drag on the next sheet in the stack so that the uppermost sheet 57 will peel away, leaving the next sheet extending through the slot 54 in the opposite direction. Covering only a peripheral portion 58 of an inner surface of the cover layer 52 is a coating of pressure-sensitive adhesive (which adhesive could be aggressive or repositionable) which coating is protected by a disposable release liner 59. The release liner 59, then, provides protecting and retaining means for temporarily protecting the coating of pressure-sensitive adhesive on the peripheral portion 58 of the cover layer 52 and for retaining the stack of note paper or sheets along the central portion of the cover layer's inner surface. The liner 59 could be an individual sheet for the dispenser subassembly 50, or could be part of an elongate liner on which other dispenser subassemblies could be disposed as is illustrated for the dispenser subassemblies 10 in FIG. 4. Also, the liner need not be used, and the dispenser subassemblies could be stacked or concatenated as illustrated for the sheet dispenser subassemblies 40 in FIG. 5.

Figure 7:
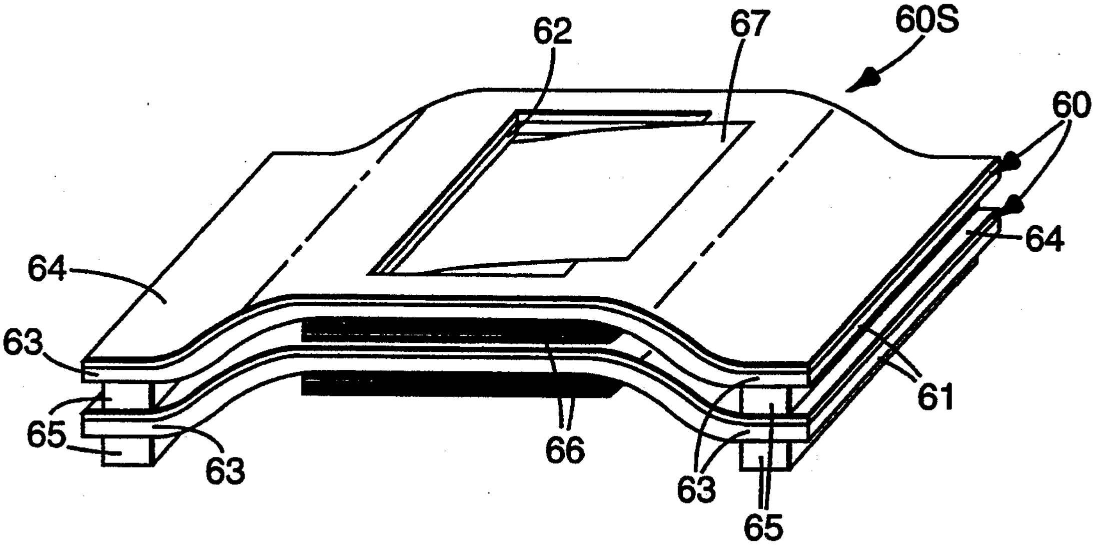
FIG. 7 is a perspective view of a plurality of fifth embodiments of sheet dispenser subassemblies according to the present invention.

Referring now to FIG. 7 of the drawing, there is illustrated a plurality of sheet dispenser subassemblies 60 according to the present invention. The two dispenser subassemblies 60 illustrated are adhered together to form a stack 60S of the subassemblies 60 (which stack could include many more subassemblies 60) from which either the top or bottom sub- assembly 60 can be peeled to be used individually.

Each of the subassemblies 60 includes a thin, elongated, tear-resistant paper or polymeric material cover layer 61 having a central transverse slot 62 and two spaced peripheral portions 63 of its inner surface on which there is a coating 65 of pressure-sensitive adhesive, and a stack 66 of adhesive coated sheets positioned adjacent the central portion of the cover layer 61 along its inner surface with an end portion 67 of the uppermost sheet in the stack 66 projecting through the slot 62 and laying along the outer surface of the cover layer 61. The outer surface of each cover layer 61 is covered with an ultrathin release coating 64. The coating 65 of pressure-sensitive adhesive of each of the dispenser subassemblies 60 temporarily adheres it to the release coating 64 of the underlying dispenser sub assembly 60 or, in the case of the lowermost sheet dispenser subassembly 60, to a disposable liner (not shown) that has an ultrathin release coating. The cover layer 61, slot 62 and release coating 64 and stack 66 of sheets of the subassemblies 60 are essentially the same as the corresponding cover layer 11*a*, slot 12*a*, release coating 13*a* and stack 16*a* of sheets of the subassembly 40 described with reference to FIG. 5. The subassemblies 60 differ from the subassemblies 40 of FIG. 5 in that they have two spaced peripheral portions 63 bearing the coating 65 of pressure-sensitive adhesive, rather than a single peripheral portion entirely around the central portion of the cover layer 61. Adhering the sheet dispenser subassemblies 60 together in the stack 60S together with the liner provides protecting and retaining means for temporarily protecting the coatings 65 of pressure-sensitive adhesive on the peripheral portions 63 of the cover layers 61 and for retaining the stack 66 of sheets along the central portions of their inner surfaces.

Figure 8:
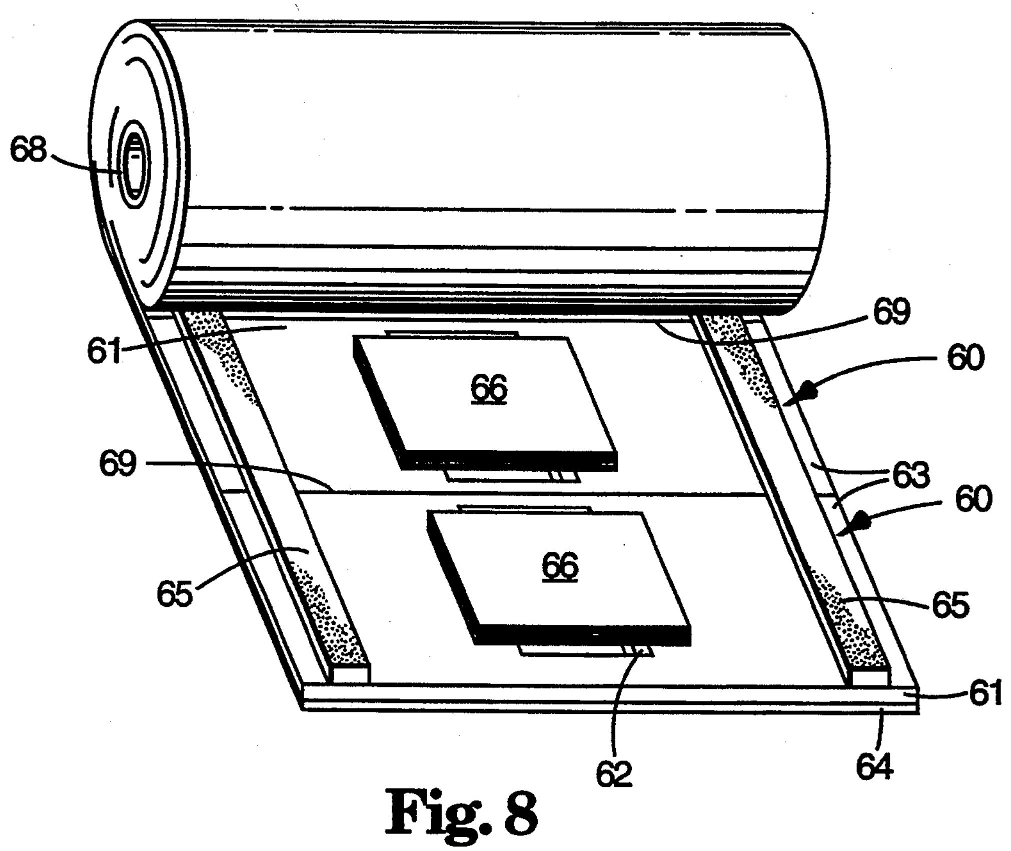
FIG. 8 is a perspective view showing a roll of a plurality of sheet dispenser subassemblies similar to those of FIG. 7 being unwound from a roll.

Instead of stacking, the protecting and retaining means for temporarily protecting the coatings 65 of pressure-sensitive adhesive on the peripheral portions 63 of the cover layers 61 and for retaining the stacks 66 of sheets along their central portions on the sheet dispenser sub assemblies 60 can be provided, as illustrated in FIG. 8, by making a concatenation of cover layers 61 from an elongate strip, and wrapping the dispenser subassemblies 60 on an inner core 68 and on themselves, after which the sub assemblies 60 can be separated either at perforations 69 between them or by cutting them apart. Thus, adhering the sheet dispenser subassemblies 60 around each other in the roll together with the core 68 provides protecting and retaining means for temporarily protecting the coatings 65 of pressure-sensitive adhesive on the peripheral portions 68 of the cover layers 60 and for retaining the stack 66 of sheets along their central portions.

Figure 9:
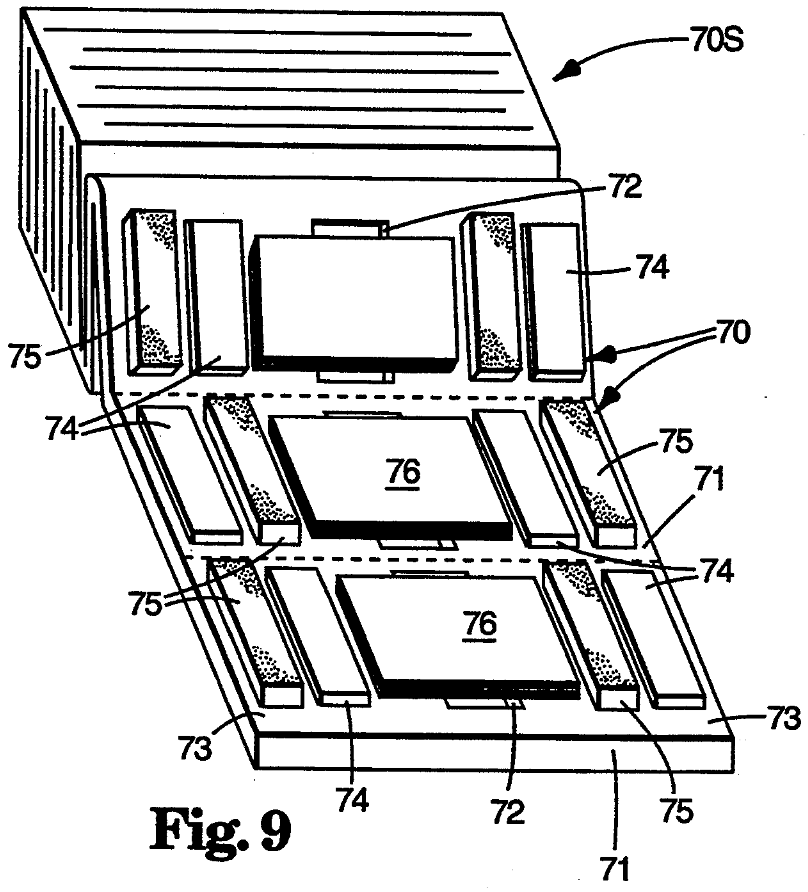
FIG. 9 is a perspective view of a plurality of sixth embodiments of sheet dispenser subassemblies according to the present invention.

Referring now to FIG. 9 of the drawing, there is illustrated a plurality of sheet dispenser subassemblies 70 according to the present invention. The three dispenser subassemblies 70 clearly illustrated are joined together along edges of their cover sheets 71, folded along those edges in the manner of fan folded sheets, and pairs of two adjacent subassemblies 70 are adhered together face to face to form a stack 75 of the pairs of subassemblies 70 (which stack includes many more subassemblies 70) from which either the top or bottom subassembly 70 can be peeled to be used individually.

The cover layer 71 for each of the subassemblies 70 is of thin, elongated, tear-resistant paper or polymeric material. The cover layer 71 has a central transverse slot 72 and two spaced peripheral portions 73 of its inner surface on which there are strip coatings 75 of pressure-sensitive adhesive. A stack 76 of adhesive coated sheets is positioned adjacent the central portion of the cover layer 71 along its inner surface with an end portion of the uppermost sheet in the stack 76 projecting through the slot 72 and laying along the outer surface of the cover layer 71. The strip coating 75 of pressure-sensitive adhesive of each of the dispenser subassemblies 70 temporarily adheres it face to face with strips 74 of release coating on the inner surface of the dispenser subassembly 70 to which it is adhered, with the positions of the strip coatings 75 of pressure sensitive adhesive and the strips 74 of release coating being positioned on each pair of dispenser subassemblies 70 adapted to be adhered together so that the coatings 75 of adhesive on one will adhere to the strips 74 of release coating on the other when the sheet subassemblies 70 are folded together along their joined edges. Adhering the sheet dispenser subassemblies 70 together to form the stack 60S provides protecting and retaining means for temporarily protecting the coatings 75 of pressure-sensitive adhesive on the peripheral portions 73 of the cover layers 71 and for retaining the stack 76 of sheets along the central portions of their inner surfaces.

Figure 10:
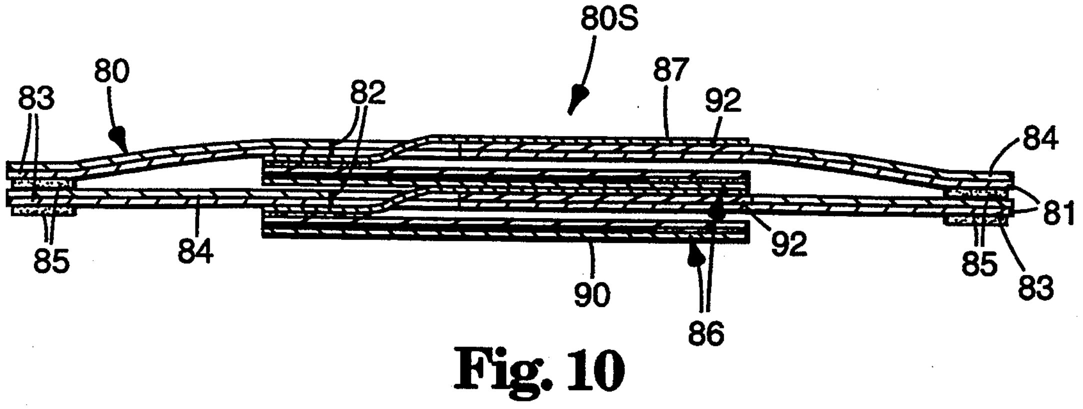
FIG. 10 is a cross sectional view of a plurality of seventh embodiments of sheet dispenser subassemblies according to the present invention.

Referring now to FIG. 10 of the drawing, there is illustrated a plurality of sheet dispenser subassemblies 80 according to the present invention. The two dispenser subassemblies 80 illustrated are adhered together to form a stack 80S of the subassemblies 80 (which stack could include many more subassemblies 80) from which either the top or bottom subassembly 80 can be peeled to be used individually.

Each of the subassemblies 80 includes a thin, elongated, tear-resistant paper or polymeric material cover layer 81 having a transverse slot 82 and two spaced peripheral portions 83 of its inner surface on which there is a coating 85 of pressure-sensitive adhesive, and a stack 86 of adhesive coated sheets positioned adjacent the central portion of the cover layer 81 along its inner surface with an end portion 87 of the uppermost sheet in the stack 86 projecting through the slot 82 and laying along the outer surface of the cover layer 81. The outer surface of each cover layer 81 is covered with an ultrathin release coating 84. The coating 85 of pressure-sensitive adhesive of each of the dispenser subassemblies 80 temporarily adheres it to the release coating 84 of the underlying dispenser sub assembly 80 or, in the case of the lowermost sheet dispenser subassembly 80, to a disposable liner (not shown) that has an ultrathin release coating. The subassemblies 80 primarily differ from the subassemblies 70 of FIG. 7 in that they are for dispensing sheets two at a time from a different type of stack 86 of sheets, and to afford such dispensing the slot 82 is not centrally located in the cover sheet. The stack 86 of sheets and the manner by which it is dispensed is described in detail in U.S. Pat. No. 5,050,909, the content whereof relating to the structure of the sheets in the stack 86 and the manner by which they are dispensed two at a time is incorporated herein by reference. Also, each of the stacks 86 of sheets has an adhesive layer 90 on its bottom surface by which it is adhered to a surface to which the coating 85 of pressure-sensitive adhesive on each of the peripheral portions 83 is adhered thereto when the sheet dispenser subassembly 80 is removed from the stack 80S and applied to that surface. Thus the cover layer 81 has a layer 92 of premium release material generally centered along its outer surface to insure separation from the stack 80S of each sheet dispenser subassembly 80 with its cover layer 81.

Adhering the sheet dispenser subassemblies 80 together in the stack 80S together with the liner provides protecting and retaining means for temporarily protecting the coatings 85 of pressure-sensitive adhesive on the peripheral portions 83 of the cover layers 81 and for retaining the stack 86 of sheets along the central portions of their inner surfaces.

Instead of stacking, the protecting and retaining means for temporarily protecting the coatings 85 of pressure-sensitive adhesive on the peripheral portions 83 of the cover layers 81 and for retaining the stacks 86 of sheets along their central portions on the sheet dispenser sub assemblies 80 can be provided by making a concatenation of cover layers 81 from an elongate strip, and wrapping the dispenser subassemblies 80 on an inner core and on themselves (not shown), after which the sub assemblies 80 can be separated either at perforations between them or by cutting them apart.

EXAMPLES

Sheet dispensers and sheet dispenser subassemblies according to the present invention were made and were tested using the following tests for adhesion and release.

Adhesion force measurement:

This test measured the separation force of the coating of pressure-sensitive adhesive coating on the cover or bottom layer of the dispenser subassembly from a standard glass surface. That coating of adhesive was applied to a clean surface on a glass plate. The dispenser sub assembly was laminated to that glass surface using two passes of a 2 kg rubber roller over the entire dispenser sub assembly. The glass plate was attached to a stationary clamp of a constant-rate-extension device. The dispenser was peeled off the glass plate at 90 degrees at a speed of 30.5 cm/min in the direction parallel to the glass surface. The width of the coating of adhesive was measured in the direction perpendicular to the peel direction. The adhesion value was reported as the measured force per width of adhesive in units of grams per 2.54 cm.

Rolled Unwinding Force:

The force required to unwind a roll of sheet dispenser subassemblies such as are illustrated in FIG. 8 was tested according to Pressure Sensitive Tape Council test method PSTC-8, except that rather than using a 1 inch wide roll, the entire roll was used no matter what its width was. The maximum force required to unwind a concatenation of sheet dispenser subassemblies from a roll was recorded as the unwind force. The width of the coating of adhesive on the sheet dispenser subassembly was measured parallel to the axis of the roll. The roll unwinding or dispensing force value was reported as the measured force per width of adhesive, in units of grams per 2.54 cm.

Stacked Dispensing Force:

The force required to peal a sheet dispenser or sheet dispenser subassembly from the underlying sheet dispenser subassemblies in a stack (see FIGS. 5, 7 and 10) was measured. That force should be sufficiently high so the stack is stable in shipping and handling, yet the force must be low enough to remove the sheet dispenser subassembly without damage thereto. A preferred range was selected that allowed facile removal of a single sheet dispenser subassembly while maintaining a stable pad. See U.S. Pat. No. 4,895,746 for a discussion of removal forces and stability, said discussion being incorporated herein by reference. A stack of two sheet dispenser subassemblies was prepared. Strips of double coated permanent tape, such as Scotch® #665, are applied over the bottom surface of the lower dispenser and adhered to a rigid plate. The plate was attached to a stationary clamp of a constant-rate-extension device. The lower surface along one edge of the upper sheet dispenser subassembly was attached to the recording device. The upper sheet dispenser subassembly was peeled off the upper surface of the lower sheet dispenser subassembly dispenser at an angle of about 90 with respect thereto at a speed of 30.5 centimeters per minute in a direction normal to the major surfaces of the lower sheet dispenser subassembly. The adhesive coating width was measured in a direction perpendicular to the direction of peel. The resultant dispensing force value was reported as the measured force per width of adhesive, in units of grams per 2.54 centimeters.

Fan folded Pad Dispensing Force:

A test was performed to measure the force required to remove one sheet dispenser subassembly from the adjacent dispenser in a fan folded stack of the type illustrated in FIG. 9. The force should preferably be very low to facilitate dispensing. A stack of two sheet dispenser subassemblies of the type illustrated in FIG. 3 were prepared. Strips of double coated permanent tape (i.e., Scotch® #665 available from 3M) were applied over the outer surface of the cover layer on one of the dispensers and was adhered to the planar surface of a rigid plate. That rigid plate was attached to a stationary clamp of a constant-rate-extension device. The other of the sheet dispenser subassemblies was peeled off that attached sheet dispenser subassembly at an angle of 90 degrees to that planar surface at a speed of 30.5 centimeters per minute in a direction perpendicular to that planar surface. The width of the coating of adhesive on the sheet dispenser subassembly being pealed away was measured along the peel line in a direction perpendicular to the direction of peel. The resultant dispensing force value was reported as the measured force per width of adhesive, in units of grams per 2.54 centimeters.

Liner removal force measurement:

A test was performed to measure the force required to remove a liner from sheet dispensers or sheet dispenser subassemblies of the types illustrated in FIGS. 1 through 4. That force should be sufficiently high so the sheet dispenser or sheet dispenser subassembly is stable in shipping and handling; however the force should be low enough to remove the liner from the sheet dispenser or sheet dispenser subassembly without damage. A preferred range was selected to facilitate removal of the liner either manually or by using automated equipment. A sheet dispenser or sheet dispenser subassembly having a liner adhered to its coating of pressure sensitive adhesive was selected. Strips of double coated permanent tape, such as Scotch® #665 available from 3M, were applied over the outer surface of its cover layer and were adhered to the planar surface of a rigid plate. The plate is attached to a stationary clamp of a constant-rate-extension device. The liner was peeled off the sheet dispenser or sheet dispenser subassembly at an angle of 90 degrees with respect to the planar surface of the plate and at a speed of 30.5 centimeters per minute. The width of the coating of adhesive was measured in a direction along the peel line and at right angles to the direction of peel. The resultant dispensing force value was reported as the measured force per width of adhesive, in units of grams per 2.54 centimeters.

EXAMPLE 1

A plurality of examples were made of the sheet dispenser subassembly illustrated in FIG. 7 in which the sheets in the stack were of paper and were disposed as described in Smith's U.S. Pat. No. 4,781,306. A stack of flexible paper sheet material commercially available from 3M under the designation "R-330" (i.e., a 7.6 cm×7.6 cm stack of paper sheets having a 1.2 cm wide layer of adhesive along opposite sides of adjacent sheets throughout the stack) was cut in a direction normal to the lengths of the layers of adhesive to provide three stacks of paper sheets 2.5 cm×7.6. A 0.5 percent solids release solution was prepared by dispersing Syl-Off 7610 and Syl-Off 7611 (commercially available from Dow Corning Corp.) in a ratio of 96.4 into methyl ethyl ketone. The solution was coated on to a 15.2 cm wide web of 60 pound C2S paper commercially available from James River Corp. under the designation "Capistrano". The coating was applied by drag coating a first major surface of the web of paper under a smooth bar. The solution was dried and cured. A seven percent adhesive dispersion of microspheres was prepared in heptane as disclosed in U.S. Pat. No. 3,691,140 (the content whereof is incorporated herein by reference). The adhesive was drag coated to the second opposite major surface of the web of paper under a bar having a 0.1 mm orifice. The adhesive was coated in two parallel 2 cm stripes, separated by 9 cm and dried. An uncoated 1 cm margin extended from the stripe to the edge of the web. The adhesive was dried. Lengths each 6.3 cm long were cut from the web by cutting at right angles to the stripes of adhesive. A slot 3.2 cm×1.2 cm was cut in the center of each length with the 3.2 cm dimension of the slot parallel to the stripes of adhesive, thus forming cover layers for the sheet dispenser subassemblies. A stack of 12 of the paper sheets was positioned along the inner surface of each cover layer between its coatings of adhesive with an end portion of the uppermost sheet in the stack projecting through its slot to form 10 sheet dispenser sub assemblies of the type illustrated in FIG. 7. Five such sheet dispenser subassemblies were aligned and assembled into a stack, and the coatings of adhesive on the peripheral portions of the bottom most sheet dispenser subassembly in the stack was adhered to an uncoated copy paper.

The dispensing force for removing a sheet dispenser sub assembly from the stack was about 38 grams per 2.54 centimeters width. The adhesion of the removed sheet dispenser sub assembly to the glass plate was about 48 grams per 2.54 centimeters width, and the sheet dispenser subassemblies greatest thickness normal to that glass plate was about 1.2 millimeters. Sheet dispenser subassemblies were removed from the stack and adhered on the pages in personal organizers. Sheets were dispensed from the sheet dispensers thus formed, and the sheet dispenser subassemblies were moved between pages in the personal organizers and were still found to be useful for dispensing sheets.

EXAMPLE 2

A plurality of examples were made of the sheet dispenser subassembly and were rolled into a roll as is illustrated in FIG. 8. A web coated with release material on one major surface and parallel stripes of pressure sensitive adhesive on the other was prepared as described in Example 1. The web was perforated transverse to the stripes of adhesive to form ten 6.3 cm lengths. A slot 3.2 cm×1.2 cm was cut in the center of each length with the 3.2 cm dimension of the slot parallel to the stripes of adhesive, thus forming cover layers for the sheet dispenser subassemblies. A stack of 12 of the paper sheets described in Example 1 was positioned along the inner surface of each cover layer between its coatings of adhesive with an end portion of the uppermost sheet in the stack projecting through its slot to form 10 sheet dispenser sub assemblies of the type illustrated in FIG. 8. The resultant concatenation of dispenser subassemblies was wound into a roll around on to a 7.6 cm diameter core.

The force required to unwind the roll was about 39 g/2.54 cm, the adhesion of each dispenser subassembly to a glass plate was about 52 g/2.54 cm, and the greatest thickness of the dispenser subassemblies was about 1.2 mm.

Sheet dispenser subassemblies were removed from the roll and adhered to the pages of calendars. Sheets were dispensed from the sheet dispensers thus formed, and the sheet dispenser subassemblies were moved between pages of the calendars and were still found to be useful for dispensing sheets.

EXAMPLE 3

A plurality of examples were made of the sheet dispenser subassembly and were fan folded together as is illustrated in FIG. 9. The paper web used in Example 1 was transversely perforated to form ten 6.3 cm lengths. Transverse slots 3.2 cm×1.2 cm were cut into the web. The slot for the first, third, fifth, seventh, and ninth segments were centered 6.4 cm from one edge of the web. The second, fourth, sixth, eighth, and tenth segments had slots centered 8.9 cm from the same edge. A transfer tape, Y-9415 (commercially available from 3M), was slit to a 1.3 cm width. The tape has adhesives on two sides, a permanent adhesive on one side, and a repositionable adhesive on the other. Pieces of the slit tape 9 cm long were cut. The permanent adhesive face was laminated to the paper web to provide an adhesive pattern with two parallel stripes for each length of the web. The two tape pieces were centered 1 cm and 9 cm respectively from the edge for the odd numbered segments, and 3 and 12 cm from the edge for even segments. Liners on the tape segments were left in place. The silicone material described in Example 1, without solvent, was brushed over the web on the surface to which the strips of adhesive were applied. The silicone was applied in the nonadhesive areas along the adhesive stripes, and cured. The liner strips were removed from the tape to expose the repositionable adhesive. The resultant structures were cover layers for the sheet dispenser subassemblies. A stack of 12 of the paper sheets described in Example 1 was positioned along the inner surface of each cover layer between its coatings of adhesive with an end portion of the uppermost sheet in the stack projecting through its slot to form 10 sheet dispenser sub assemblies of the type illustrated in FIG. 9. The concatenation of dispenser subassemblies was fan folded between the subassemblies with each two adjacent sheet dispenser subassemblies having the inner surfaces of their cover layers face-to face such that the coatings of pressure sensitive adhesive on one contacted the silicone release coating on the other. The dispensing force to separate the dispenser subassemblies was about 2 g/2.54 cm, the adhesion of the separated dispenser subassemblies to glass was about 120 g/2.54 cm, and the greatest thickness of the dispenser subassemblies was about 1.4 mm.

Sheet dispenser subassemblies were removed from the fan folded stack were adhered to the pages of calendars. Sheets were dispensed from the sheet dispensers thus formed, and the sheet dispenser subassemblies were moved between pages of the calendars and were still found to be useful for dispensing sheets.

EXAMPLE 4

A plurality of examples were made of the sheet dispenser subassembly illustrated in FIG. 10. A stack of sheet assemblies was prepared as taught in U.S. Pat. No. 5,050,909, Example No. 4, the content whereof is incorporated herein by reference. The stack size was 3.8 cm wide and 7.6 cm long. A coated web was prepared as described in Example 1. An additional coating of silicone was applied to the nonadhesive side of the web. The silicone, a solvent-less composition of 96 parts Syl-Off 7610 and 4 parts Syl-Off 7611, was brushed in the center between the adhesive stripes. The silicone was cured. Transverse slots 5.0 cm×1.2 cm were cut into the web. The slots were centered 4.5 cm from one edge of the web. The web was transversely cut into 10 lengths each 6.3 cm long, thus forming cover layers for the sheet dispenser subassemblies. A 12 sheet stack of the sheet assemblies was positioned along the inner surface of each cover layer between its coating of adhesive with an end portion of the uppermost sheet in the stack projecting through its slot to form sheet dispenser subassemblies of the type illustrated in FIG. 10. Five of the sheet dispenser subassemblies were aligned and assembled into a stack, with a silicone release liner covering the coatings of adhesive on the bottom sheet dispenser subassembly. The force required to remove a sheet dispenser subassembly from the stack was about 62 g/2.54 cm, the adhesion of the removed sheet dispenser subassembly to glass was about 475 g/2.54 (from the adhesion of the stack), and the greatest thickness of the removed sheet dispenser subassembly was about 1.1 mm. The sheet assemblies removed from the stack were found useful to attach to a clipboard and use for on-site coupons.

EXAMPLE 5

A plurality of examples were made of the sheet dispenser subassembly illustrated in FIG. 7 in the manner described in Example 1 except that the cover sheets were made 10.6 cm wide×15.2 cm long, and instead of placing the dispenser subassemblies in a stack, a liner was placed along their coatings of pressure sensitive adhesive. Those liners were pieces of bond copy paper, Springhill ® "Relay DP", commercially available from International Paper. The dispensing force required to remove the liners from the sheet dispenser sub assemblies was about 46 g/2.54 cm, the adhesion the sheet dispenser subassemblies to glass was about 42 g/2.54 cm, and the sheet dispenser subassemblies greatest thickness (including the release liners) was about 1.4 mm. The sheet dispenser subassemblies were applied to textbooks, where sheets from the dispensers were used during reading, and the sheet dispenser subassemblies were periodically repositioned within the textbooks.

EXAMPLE 6

A plurality of examples were made of the sheet dispenser subassembly generally as illustrated in FIGS. 1 and 2 except that the cover layers were made as illustrated in FIG. 3. Ten sheet stacks from the product sold as Post-it (TM) tape flags and described in U.S. Pat. No. 4,907,825 were used in the sheet dispenser subassemblies. Cover layers were formed using polymeric label stock, Stamark ® #7777 (commercially available from 3M), consisting of an adhesive coated face stock and a paper release liner. The label stock was printed and die-cut to provide slots having dimensions 16 mm long and 4.7 cm wide. The liner was die-cut to provide rectangles 6.7 cm long×3.5 cm wide, centrally located around the slots. The portion of the label stock liner around those rectangles was stripped from the adhesive. A secondary paper, Daubert 4020 (commercially available from Daubert Coated Papers Company) was laminated to the exposed adhesive. The label face stock was then die-cut on the secondary paper to provide rectangular 8.9 cm long and 5.7 cm wide centered about the slots, thereby forming cover layers for the sheet dispenser subassemblies, and was wound up into a roll. Subsequently, the cover layers for the sheet dispenser subassemblies were individually removed from the secondary liner, the stacks of sheets were positioned adjacent their inner surfaces with end portions of their uppermost sheets projecting through the slots, and the resultant sheet dispenser subassemblies were again laminated to the secondary liner. The dispensers on the liner were wound into a long roll. The dispensing force for removing the sheet dispenser subassemblies from the liner was about 11 g/2.54 cm, the adhesion of the removed sheet dispenser subassemblies to glass was about 465 g/2.54 cm, and they had a thickness of about 0.8 mm. The removed sheet dispenser subassemblies were applied to a telephone book cover. The sheets or tape flags were dispensed to mark pages containing important numbers.

EXAMPLE 7

A plurality of examples were made of the sheet dispenser subassembly generally as illustrated in FIG. 3 except that their cover layers were made as illustrated in FIG. 7. A first paper web was prepared and coated as described in Example 1 so that it had release coating on one surface, and adhesive stripes on the other. Transverse slots, 3.2 cm×1.2 cm were cut in the center of the web, at 6.3 cm increments. The slot width was along the web machine direction. A second paper web of the same paper material was prepared by coating the center 12.7 cm of the web using adhesive described in Example 1. Leader Lengths of Post-it TM Correction and Cover-up tape #651, 5 cm long had first end portions laminated to the silicone-coated surface of the first web and second end portions threaded through the slots, leaving 1.2 cm lengths of the adhesive coated leader lengths exposed along the surface of the first web between the stripes of adhesive. Stacks of 12 paper sheets of the type described in Example 1 were placed over the tabs so that the end portions on the uppermost sheets in the stacks were adhered to the exposed adhesive on the leader lengths. The second web was then laminated to the stripes of adhesive along the first web with the stacks of sheets between the webs and the adhesive coating on the second web exposed. Sections were cut from the laminate between the slots to provide sheet dispensers 6.3 cm wide. The sheet dispensers were aligned and assembled into a stack. The force required to separate the dispensers from the stack was about 42 g/2.54 cm. The separated dispensers had an adhesion to glass of about 56 g/2.54 centimeters, and had a thickness of about 1.1 mm.

EXAMPLE 8

A plurality of the dispensers made as described in Example 7 were adhered along a release liner of Daubert 4020 and wound into a roll. The force required to separate the dispensers from the liner was about 38 g/2.54 cm. The separated dispensers had an adhesion to glass of about 50 g/2.54 centimeters, and had a thickness of about 1.4 mm including the release liner. The roll of dispensers on the release liner was easily stored in a desk drawer until the dispensers were put to use such as on a personal organizer.

EXAMPLE 9

Dispenser subassemblies were prepared as taught in Example 6. A second paper web was prepared by adhesive coating the center 12.7 cm of the web using the paper and adhesive described Example 1. The dispenser subassemblies were removed from the silicone release liner and laminated to the nonadhesive face of the second web. The laminate was then cut to form sheet dispensers similar to those illustrated in FIG. 3, and were then adhered by the adhesive coatings on their bottom layers in spaced relationship along the silicone release liner from which the dispenser subassemblies were removed. The force required to separate the dispensers from the liner was about 3 g/2.54 cm. The separated dispensers had an adhesion to glass of about 45 g/2.54 centimeters, and had a thickness of about 0.9 mm including the release liner.

EXAMPLE 10

A plurality of examples of sheet dispensers according to the present invention were constructed from a durable card stock material, using stacks of paper sheets of the type described in U.S. Pat. No. 4,781,306. Card stock 0.5 mm thick, was cut into sections 14.6 centimeters long×6.3 cm wide, transverse slots, 3.2 cm×1.2 cm were cut in the center. Strips of permanent double-coated tape, 1.2 cm wide, were secured along the narrow edges of the sections. The card stock was folded over the tape and laminated to form a permanent bond.

The lowermost folded portions of the card stock had lengths of Scotch® Y-9415 tape laminated to them. The liner from the tape was removed to expose the repositionable adhesive, thus forming cover layers for the sheet dispenser subassemblies. Stacks of 25 sheets were positioned along the inner surfaces of the cover layers between the strips of adhesive with end portions of the uppermost sheets of the stacks projecting through the slots. The resultant sheet dispenser subassemblies were adhered together into a stack. The force required to separate the dispensers from the stack was about 39 g/2.54 cm. The separated dispensers had an adhesion to glass of about 140 g/2.54 centimeters, and had a thickness of about 3.32 mm. The stiff dispenser subassemblies were easy to find in a book, where the sheets from the dispensers were put to use.

The present invention has now been described with reference to several embodiments thereof. It will be apparent to those skilled in the art that many changes can be made in the embodiments described without departing from the scope of the present invention. Thus the scope of the present invention should not be limited to the structures methods described in this application, but only by structures and methods described by the language of the claims and the equivalents of those structures and methods.

What is claimed is:

1. A sheet dispenser subassembly adapted for use on a surface such as that of a page in a book or magazine, said sheet dispenser subassembly comprising:

(a) a stack of sheets disposed one on top of another, each sheet comprising a backing having opposite first and second major side surfaces and opposite first and second ends with ends of the sheets being in alignment in the stack, and a layer of adhesive permanently adhered to the first side surface of said backing, the layers of adhesive of said sheets being releasably adhered along the second surfaces of the adjacent sheets in said stack, at least some of said sheets comprising release means for providing a first adhesion level along first end portions of said sheets adjacent said first ends of said backings between said first side surfaces and the second side surfaces of the adjacent sheets in the stack to which the layers of adhesive are releasably adhered, which first adhesion level provides a sufficiently low or no release force between said first side surfaces and the adjacent sheets to which the adhesive along those first side surfaces are releasable adhered to afford sliding movement between the side surfaces of the adjacent sheets along said first end portions, and attachment means for providing a second adhesion level along second end portions of said sheets adjacent said second ends of said backings between said layers of adhesive and the second side surfaces of the adjacent sheets in the stack to which said layers of adhesive are releasably adhered, which second adhesion level provides a release force that is higher than said sufficiently low release force along said first end portions and firmly adhere the sheets to the adjacent sheets in the stack during sliding movement of the sheets relative to the adjacent sheets along said first end portions while affording peeling away of the sheets from the stack along said second end portions;

(b) a cover layer having inner and outer major surfaces, a central portion, a peripheral portion or portions on at least two opposite sides of said central portion, and a through slot extending transversely across said central portion;

(c) said stack of sheets being positioned along the inner surface adjacent said central portion with the first end portion of the uppermost sheet in the stack extending through said slot;

(d) said sheets and slot being adapted to afford dispensing of the sheet having the first end portion extending through the slot when that first end portion is manually pulled through the slot by sequential sliding movement of one of the sheets relative to the adjacent sheet along the first end portion and peeling away of the sheet from the stack along said second end portion, and positioning of the first end portion of an underlying sheet in a position extending through the slot as a result of said dispensing;

(e) a coating of pressure-sensitive adhesive on said inner surface along said peripheral portion or portions of the cover layer;

(f) means for causing said inner surface along said central portion to be free of adhesive; and (g) protecting and retaining means for temporarily protecting said coating of pressure-sensitive adhesive on said peripheral portion or portions and retaining said stack of sheets along the central portion;

said sheet dispenser subassembly being less than 6 millimeters in thickness.

2. A sheet dispenser subassembly according to claim 1 wherein said protecting and retaining means for temporarily protecting said coating of pressure-sensitive adhesive on said peripheral portion or portions and retaining said stack of sheets along the central portion comprises a disposable release liner removably adhered to said coating of pressure-sensitive adhesive and across said stack and said central portion to temporarily enclose and retain the stack of sheets along the central portion, said release liner being removable to permit the cover layer to be adhered by said coating of pressure-sensitive adhesive on a surface with the stack of sheets in a chamber defined between the central portion of the cover layer and an adjacent portion of the surface with the first end portion of the uppermost sheet in the stack projecting through the slot and positioned along said outer surface in a position where it may be withdrawn from the stack through the slot and will carry with it through the slot the first end portion of an underlying sheet in the stack.

3. A plurality sheet dispenser subassemblies according to claim 2 wherein the disposable release liner for each sheet dispenser subassembly is a portion of an elongate strip, said elongate strip being helically wound into a roll.

4. A sheet dispenser subassembly according to claim 1, wherein said sheet dispenser subassembly is one of a plurality of identical sheet dispenser subassemblies disposed adhered together with the layer of pressure-sensitive adhesive on said inner surface along said peripheral portion or portions of the cover layer on the majority of the sheet dispenser subassemblies being releasably adhered to the outer surface of the cover layer on an underlying adjacent sheet dispenser subassembly.

5. A plurality of sheet dispenser subassemblies according to claim 4 wherein the outer surface of said cover layers are covered with a release coating, and said sheet dispenser subassemblies are aligned in a stack.

6. A plurality of sheet dispenser subassemblies according to claim 4 wherein said cover layers of said plurality of sheet dispenser subassemblies are provided by a substantially continuous polymeric film, the outer surfaces of said cover layers are covered with a release coating, and said substantially continuous polymeric film is helically wound into a roll.

7. A plurality of sheet dispenser subassemblies according to claim 6 wherein said substantially continuous polymeric film providing said cover layers is perforated between adjacent sheet dispenser subassemblies to afford separation of sheet dispenser subassemblies.

8. A sheet dispenser subassembly according to claim 1 wherein said cover layer comprises a thin, tear-resistant polymeric film.

9. A sheet dispenser subassembly according to claim 1 wherein:

(a) the first end of each sheet in the stack is in alignment with the second end of an adjacent sheet in the stack, said sheets comprise release means for providing said first adhesion level along a first end portion of each of said sheets adjacent said first end of said backing between said first side surface and the second side surface of the adjacent sheet in the stack to which the layer of adhesive is releasably adhered, and attachment means for providing said second adhesion level along the second end portion of each of said sheets adjacent said second end of said backing between said layer of adhesive and the second side surface of the adjacent sheet in the stack to which said layer of adhesive is releasably adhered;

(b) said stack of sheets includes a lowermost sheet that is free of adhesive; and (c) the stack and the inner surface of said cover layer are sized to afford shuttling back and forth motion of the stack adjacent said inner surface in a direction orthogonal to the transverse slot when sheets of the stack are successively pulled through said slot.

10. A sheet dispenser subassembly according to claim 1 wherein said cover layer is from 0.02 to 0.05 mm in thickness.

11. A sheet dispenser subassembly according to claim 1 wherein said layer of pressure-sensitive adhesive covers at least 50% of the first side surface of the sheet and said first side surface of the sheet has a portion that is adhesive free to provide said release means for providing said first adhesion level.

12. A sheet dispenser subassembly according to claim 5 wherein the portion of each sheet that bears a layer of pressure-sensitive adhesive is transparent, and the portion that is free from adhesive is brightly colored.

13. A sheet dispenser subassembly according to claim 1 wherein said layer of pressure-sensitive adhesive covers less than 50% of the first side surface of the sheet.

14. A sheet dispenser subassembly according to claim 1 wherein said layer of pressure-sensitive adhesive covers the entire first side surface of each of the sheets.

15. A sheet dispenser subassembly according to claim 1 wherein said cover layer consists of biaxially oriented polypropylene.

16. A sheet dispenser subassembly according to claim 1 wherein said coating of pressure-sensitive adhesive layer covers the entire cover layer and a non-adhesive layer is adhered to the pressure-sensitive adhesive layer along said central portion to provide said means for causing said inner surface along said central portion to be free of adhesive, leaving the pressure-sensitive adhesive layer exposed only along said peripheral portion or portions.

17. A sheet dispenser subassembly according to claim 1 wherein said coating of pressure-sensitive adhesive is repositionable pressure-sensitive adhesive.

18. A sheet dispenser subassembly according to claim 11 wherein said coating of pressure-sensitive adhesive comprises solid, inherently tacky, elastomeric microspheres.

19. A sheet dispenser subassembly according to claim 1 wherein said cover layer is supple and less than 0.2 millimeter (0.008 inch) in thickness, and said sheet dispenser subassembly is less than 3.5 millimeters in thickness.

20. A sheet dispenser subassembly according to claim 1 wherein said sheets include both body portions and tab portions projecting from said tab portions.

21. A pop-up sheet dispenser comprising:

(a) a stack of sheets disposed one on top of another, each sheet comprising a backing having opposite first and second major side surfaces and opposite first and second ends with ends of the sheets being in alignment in the stack, and a layer of adhesive permanently adhered to the first side surface of said backing, the layers of adhesive of said sheets being releasably adhered along the second surfaces of the adjacent sheets in said stack, at least some of said sheets comprising release means for providing a first adhesion level along first end portions of said sheets adjacent said first ends of said backings between said first side surfaces and the second side surfaces of the adjacent sheets in the stack to which the layers of adhesive are releasably adhered, which first adhesion level provides a sufficiently low or no release force between said first side surfaces and the adjacent sheets to which the adhesive along those first side surfaces are releasable adhered to afford sliding movement between the side surfaces of the adjacent sheets along said first end portions, and attachment means for providing a second adhesion level along second end portions of said sheets adjacent said second ends of said backings between said layers of adhesive and the second side surfaces of the adjacent sheets in the stack to which said layers of adhesive are releasably adhered, which second adhesion level provides a release force that is higher than said sufficiently low release force along said first end portions and firmly adhere the sheets to the adjacent sheets in the stack during sliding movement of the sheets relative to the adjacent sheets along said first end portions while affording peeling away of the sheets from the stack along said second end portions;

(b) a supple cover layer less than 0.2 millimeter (0.008 inch) in thickness having inner and outer major surfaces, a central portion, a peripheral portion or portions on at least two opposite sides of said central portion, and a through slot extending transversely across said central portion;

(c) said stack of sheets being positioned along the inner surface adjacent said central portion with the first end portion of the uppermost sheet in the stack extending through said slot;

(d) a thin, supple bottom layer having inner and outer surfaces, said bottom layer extending over the inner surface of the cover layer and the stack of sheets and being attached to said peripheral portion of the cover layer with the inner surface of the bottom layer adjacent the cover layer to form a chamber around the stack of sheets;

(e) said sheets, slot and chamber being adapted to afford dispensing of the sheet having the first end portion extending through the slot when that first end portion is manually pulled through the slot by sequential sliding movement of one of the sheets relative to the adjacent sheet along the first end portion and peeling away of the sheet from the stack along said second end portion, and positioning of the first end portion of an underlying sheet in a position extending through the slot as a result of said dispensing;

(f) a layer of pressure-sensitive adhesive on the outer surface of the bottom layer; and (g) a disposable release liner over the surface of the layer of pressure-sensitive adhesive layer opposite the bottom layer, which release liner can be removed to permit the dispenser to be adhered to a surface.

22. A pop-up sheet dispenser according to claim 21 wherein:

(a) the first end of each sheet in the stack is in alignment with the second end of an adjacent sheet in the stack, said sheets comprise release means for providing said-first adhesion level along a first end portion of each of said sheets adjacent said first end of said backing between said first side surface and the second side surface of the adjacent sheet in the stack to which the layer of adhesive is releasably adhered, and attachment means for providing said second adhesion level along the second end portion of each of said sheets adjacent said second end of said backing between said layer of adhesive and the second side surface of the adjacent sheet in the stack to which said layer of adhesive is releasably adhered;

(b) said stack of sheets includes a lowermost sheet that is free of adhesive; and (c) the slot, stack and chamber are sized and positioned to afford shuttling back and forth motion of the stack within the chamber in a direction orthogonal to the transverse slot when sheets of the stack are successively pulled through said slot.

23. A pop-up dispenser according to claim 21 wherein the bottom layer is a polymeric film that is less than 0.13 mm in thickness.

24. A pop-up dispenser according to claim 21 wherein each of the cover layer and the bottom layer has a thickness in the range of 0.02 to 0.05 millimeters.

25. A pop-up dispenser according to claim 21 wherein the disposable release liner is an elongate strip on which a plurality of identical pop-up dispensers are positioned, said elongate strip of disposable release liner and pop-up dispensers being helically wound into a roll.

26. A pop-up dispenser according to claim 25 wherein at least one of said cover and bottom layers of said plurality of pop-up dispensers is provided by a substantially continuous polymeric film that is perforated between adjacent pop-up dispensers to afford separation of the pop-up dispensers.

* * * * *